(12) United States Patent
Von Wendorff

(10) Patent No.: US 7,159,152 B2
(45) Date of Patent: Jan. 2, 2007

(54) SYSTEM WITH A MONITORING DEVICE THAT MONITORS THE PROPER FUNCTIONING OF THE SYSTEM, AND METHOD OF OPERATING SUCH A SYSTEM

(75) Inventor: Wihard Christophorus Von Wendorff, München (DE)

(73) Assignee: Infineon Technologies AG, Munich (DE)

( * ) Notice: Subject to any disclaimer, the term of this patent is extended or adjusted under 35 U.S.C. 154(b) by 535 days.

(21) Appl. No.: 10/429,576

(22) Filed: May 5, 2003

(65) Prior Publication Data
US 2003/0214305 A1 Nov. 20, 2003

(30) Foreign Application Priority Data
May 3, 2002 (EP) .................................. 02009949

(51) Int. Cl.
*G06F 11/00* (2006.01)
(52) U.S. Cl. .............................. 714/47; 714/48; 714/49
(58) Field of Classification Search ............ 714/47–49, 714/15, 21, 23
See application file for complete search history.

(56) References Cited

U.S. PATENT DOCUMENTS

| | | | | |
|---|---|---|---|---|
| 3,736,566 A | * | 5/1973 | Anderson et al. ............. | 714/15 |
| 4,982,402 A | * | 1/1991 | Beaven et al. ................ | 714/15 |
| 5,119,483 A | * | 6/1992 | Madden et al. ............... | 714/15 |
| 5,170,109 A | * | 12/1992 | Yanagita et al. .......... | 318/568.1 |
| 5,189,352 A | | 2/1993 | Hamaya | |
| 5,984,506 A | * | 11/1999 | Robbiani et al. ........... | 700/162 |
| 5,987,628 A | * | 11/1999 | Von Bokern et al. ......... | 714/48 |
| 6,035,424 A | * | 3/2000 | Freerksen et al. ............ | 714/40 |
| 6,356,806 B1 | | 3/2002 | Grob et al. | |
| 6,571,317 B1 | * | 5/2003 | Supnet ....................... | 711/133 |
| 6,629,271 B1 | * | 9/2003 | Lee et al. ..................... | 714/49 |
| 6,785,847 B1 | * | 8/2004 | Jordan et al. ................. | 714/37 |
| 6,795,937 B1 | * | 9/2004 | Harris et al. ................. | 714/42 |

FOREIGN PATENT DOCUMENTS

| | | |
|---|---|---|
| DE | 196 14 748 A1 | 10/1997 |
| DE | 196 14 201 A1 | 11/1997 |
| EP | 0 137 046 A1 | 4/1985 |
| EP | 0 766 153 A1 | 4/1997 |
| EP | 1 011 035 A2 | 6/2000 |

\* cited by examiner

*Primary Examiner*—Scott Baderman
*Assistant Examiner*—Timothy M. Bonura
(74) *Attorney, Agent, or Firm*—Laurence A. Greenberg; Werner H. Stemer; Ralph E. Locher

(57) ABSTRACT

A system and a method are distinguished by the fact that, if it is determined that the system is not operating properly, a control device is stopped and it is ensured that the control device, when operation is continued, begins with the execution of the operation whose faulty execution may be the cause for the fault registered, or which was being executed when the fault was registered. This makes it possible, with little effort and without noticeable disruption to the operation of the system, to determine whether improper operation of the system is of only a temporary nature or of a permanent nature, and for the system or parts of the same to be deactivated or reset only when the fault that has occurred is not a temporary fault.

38 Claims, 4 Drawing Sheets

SYSTEM WITH A MONITORING DEVICE THAT MONITORS THE PROPER FUNCTIONING OF THE SYSTEM, AND METHOD OF OPERATING SUCH A SYSTEM

BACKGROUND OF THE INVENTION

Field of the Invention

The present invention relates to a system having an electric control device and a monitoring device that monitors whether the system is operating properly, and also to a method of operating such a system.

Systems having a monitoring device that monitors the proper functioning of the system are, for example, failsafe systems or fault-tolerant systems.

Such systems generally have the special feature that they contain specific components many times, in more precise terms contain components which execute or bring about the same or mutually corresponding actions.

The plurality of components which execute or bring about the same or mutually corresponding actions can, for example, but of course not exclusively, be identically constructed and identically operated control devices, such as identically constructed and identically operated microprocessors or microcontrollers, or identically constructed and identically operated cores of one or more microprocessors or microcontrollers.

The checking of the proper functioning of such a system is generally carried out by a check being made to see whether the components that execute or bring about the same or mutually corresponding actions supply identical or mutually corresponding results or intermediate results.

If it is determined by the monitoring device that this is not the case, the faulty component is deactivated and possibly replaced by one of the other components that execute or bring about the same or mutually corresponding actions (in the case of fault-tolerant systems), or the entire system is deactivated (in the case of failsafe systems).

It is therefore possible to ensure that the apparatus controlled by the system, for example the anti-lock braking system or the airbag of a motor vehicle, does not go completely out of control.

On the other hand, however, it is the case that, as a result of the deactivation of the system or specific parts of the same, no proper control or not so reliable control of the apparatus controlled by the system is possible any more.

However, there are also cases in which the improper operation of a system component is of a temporary nature. This is the case, for example, when the system operates by using data during the storage of which, because of an event which is singular and generally not repeated, for example because of electromagnetic interference which does not occur normally, a fault has occurred. In this case, it would not be necessary for deactivation of the system or the system component affected by the fault to be carried out; it would be sufficient for the system or the relevant system component to be reset. However, resetting the system or the system component affected by the fault and any synchronization which may be required of the system components executing or bringing about the same or mutually corresponding actions often lasts for such a long time that it cannot be carried out in practice or only at the expense of considerable disadvantages. This is because, while the system is being reset, the apparatus controlled by the latter cannot be controlled or can be controlled only to a restricted extent.

SUMMARY OF THE INVENTION

It is accordingly an object of the invention to provide a system with a monitoring device that monitors the proper functioning of the system, and a method of operating such a system that overcome the above-mentioned disadvantages of the prior art devices and methods of this general type. The present invention is therefore based on the object of finding a possible way by which, with little effort and without noticeable disruption to the operation of the system, it is possible for the system or parts of the same to be deactivated or reset only when the fault that has occurred is not a temporary fault.

With the foregoing and other objects in view there is provided, in accordance with the invention, a system. The system contains an electric control device, and a monitoring device coupled to the electrical control device and monitoring whether the system is operating properly. If the monitoring device determines that the system is not operating properly, the monitoring device stops the electrical control device and ensures that the electrical control device, when operation continues, begins with execution of an operation whose faulty execution may be a cause of a fault registered or which was being executed when the fault was registered.

The system according to the invention is distinguished in that, if it is determined that the system is not operating properly, a monitoring device stops the control device and ensures that the control device, when operation is continued, begins with the execution of the operation whose faulty execution may be the cause of the fault registered or which was being executed when the fault was registered.

The method according to the invention is distinguished in that, if it is determined that the system is not operating properly, the control device is stopped and it is ensured that the control device, when operation is continued, begins with the execution of the operation whose faulty execution may be the cause of the fault registered or which was being executed when the fault was registered.

As a result, within an extremely short time, in particular without resetting the control device or the system containing the latter, it can be determined whether the fault registered during the monitoring is a temporary or a permanent fault. If the fault registered occurs again after the operation of the control device has been continued, then this is a permanent fault, and the system or specific parts of the same must be reset or deactivated; on the other hand, if the fault does not recur, then the system can continue to operate normally.

Therefore, with little effort and without noticeable disruption to the system, it is possible for the system or parts of the same to be reset or deactivated only when the fault registered is a permanent fault.

In accordance with an added feature of the invention, if the monitoring device determines that the system is not operating properly, the monitoring device resets the electrical control device into a state that the system had at a time at which the system was still operating properly.

In accordance with another feature of the invention, a further control device is provided and coupled to the monitoring device. The monitoring device assumes that the system is not operating properly if the monitoring device determines, during monitoring, that data output by the electric control device does not agree with further data or does not correspond to the further data output by the further control device.

In accordance with an additional feature of the invention, the electrical control device and the further control device are devices that execute or bring about the same or mutually corresponding actions.

In accordance with a further feature of the invention, if the monitoring device determines that the system is not operating properly, the monitoring device causes the electrical control device to repeat an output of the data.

In accordance with a further added feature of the invention, the monitoring device causes the electrical control device to repeat the data output by resetting the electrical control device into a state that the electrical control device had immediately before outputting the data.

In accordance with a further additional feature of the invention, the electrical control device is a core of a program-controlled unit. Commands to be executed by the core pass through a pipeline, and the monitoring device causes the electrical control device to repeat the data output by resetting the pipeline into a state that the pipeline had when it carried out the outputting of the data for a first time.

In accordance another further feature of the invention, the monitoring device causes the electrical control device to repeat the data output by resetting the electrical control device into a state which the electrical control device had at a start of executing an operation causing the data output.

In accordance with a another added feature of the invention, the electrical control device is a core of a program-controlled unit, and the monitoring device causes the electrical control device to repeat the data-output by ensuring that a command causing the data output is loaded again and executed again.

In accordance with another addition feature of the invention, a storage device is provided and coupled to the core. The monitoring device ensures that, during a renewed execution of the command, the core is fed with operands needed to execute the command from the storage device being a different storage device than was used during a preceding execution of a relevant command.

In accordance with a feature of the invention, a storage device is provided and coupled to the electrical control device. A further control device is coupled to the monitoring device. The monitoring device assumes that the system is not operating properly if the monitoring device determines, during monitoring, that data fed to the electrical control device from the storage device does not agree with further data which the electrical control device or the further control device has previously written into the storage device.

In accordance with an added feature of the invention, the electrical control device and the further control device are devices that execute or bring about the same or mutually corresponding actions.

In accordance with another feature of the invention, if the monitoring device determines that the system is not operating properly, the monitoring device ensures that faulty data is corrected. The correction can be made by using a code permitting an error correction. A further storage device can be provided, and a correction is made by overwriting a part of the storage device storing the faulty data with data stored in the further storage device.

In accordance with a further feature of the invention, if the monitoring device assumes that the system is not operating properly, the monitoring device influences the electrical control device to read corrected data in after correcting faulty data.

In accordance with another further feature of the invention, the influencing of the electrical control device consists in ensuring that the electrical control device is in a state which the electrical control device had when the faulty data was fed to it. The influencing of the electrical control device includes stopping the electrical control device at least until a time at which the faulty data is corrected.

In accordance with a concomitant feature of the invention, the electrical control device is a core of a program-controlled unit. Commands to be executed by the core pass through a pipeline, and in that influencing the electrical control device includes resetting the pipeline into a state that the pipeline had when the faulty data was fed to the pipeline.

With the foregoing and other objects in view there is further provided, in accordance with the invention, a method of operating a system having an electric control device and a monitoring device for monitoring whether the system is operating properly. The method includes determining if the system is operating properly, and stopping the electrical control device if the system is not operating properly, and ensuring that the electrical control device, when operation is continued, begins with an execution of an operation whose faulty execution may be a cause of a fault registered or which was being executed when the fault was registered.

Other features which are considered as characteristic for the invention are set forth in the appended claims.

Although the invention is illustrated and described herein as embodied in a system with a monitoring device that monitors the proper functioning of the system, and a method of operating such a system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
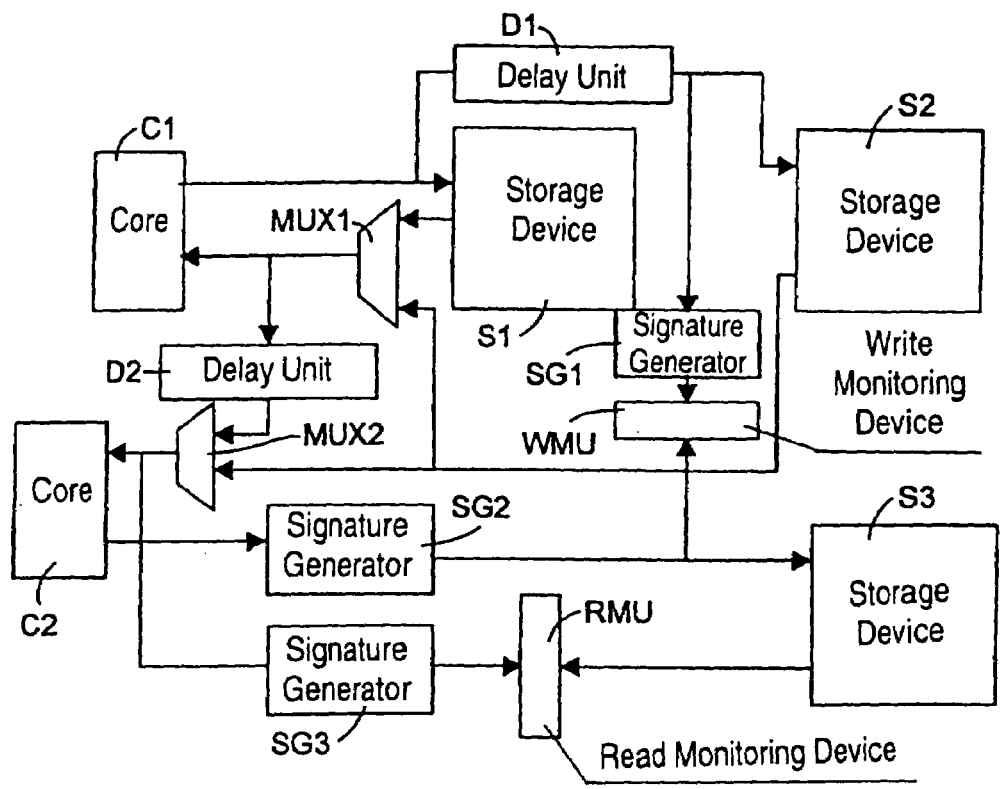
FIG. 1 is a block circuit diagram of a configuration for controlling an anti-lock braking system according to the invention.

Referring now to the single FIGURE of the drawing in detail, there is seen a configuration used to control an anti-lock braking system of a motor vehicle. However, such a configuration can also be used for controlling any other desired apparatus.

The configuration is a constituent part of a fault-tolerant system or a failsafe system and contains a plurality of components which execute or bring about the same or mutually corresponding actions, and a monitoring device, which monitors whether the components that execute or bring about the same or mutually corresponding actions actually execute or bring about the same or mutually corresponding actions.

The components that execute or bring about the same or mutually corresponding actions in the example considered are two control devices, the control devices in the example considered being formed by two cores or CPUs of a program-controlled unit such as a microcontroller or microprocessor.

However, there is no restriction to this. The components that execute or bring about the same or mutually corresponding actions can also be devices other than cores, for example what are known as state machines or other control devices. Furthermore, the components do not have to be a constituent part of a single program-controlled unit either. They can also be a constituent part of various program-controlled units, and they can also be a constituent part of one or more other devices.

In the example considered, the cores operate with a time offset. Therefore, the actions executed or brought about by one core are executed or brought about by the other core at a specific time (one or more clock periods) later. However, there is likewise no restriction to this. The special features of the configuration described below may also be used in configurations in which the components that execute or bring about the same or mutually corresponding actions execute or bring about the relevant actions simultaneously.

The configuration described below is shown in the FIGURE.

The configuration shown contains a first core C1, a second core C2, a first storage device S1, a second storage device S2, a third storage device S3, a first delay apparatus D1, a second delay apparatus D2, a first signature generator SG1, a second signature generator SG2, a third signature generator SG3, a first multiplexer MUX1, a second multiplexer MUX2, a write monitoring device WMU and a read monitoring device RMU.

The first core C1 and the second core C2 are the cores already mentioned above, which execute or bring about identical or mutually corresponding actions.

The cores C1 and C2 are identically constructed cores, which operate in such a way that they run the same program with a time offset. As a result, during proper operation of the configuration, the actions executed or brought about by the first core C1 are executed by the second core C2 a specific delay time td (a specific number of clock periods) later.

The data that represents the program to be executed by the cores C1 and C2 is stored in a program memory, not shown in the FIGURE. In the example considered, only a single program memory is provided, and the program to the executed by the cores C1 and C2 is stored in the program memory only once. The program to be executed by the cores C1 and C2 can be read out from the program memory in such a way that the program memory is addressed by the first core C1 and caused to output the appropriate data, and that the data then output from the program memory is fed to the core C1 and, delayed by the delay time td already mentioned above, is fed to the core C2. The delay is provided by a delay apparatus, not shown in the FIGURE.

At this point, it should be noted that the delay apparatus D1 and D2 delay the output of the data fed to them by the delay time td.

The cores C1 and C2 process the commands that are represented by the data received from the program memory in the conventional way. Processing is carried out in a pipeline that, in the example considered, contains four stages. The pipeline stages in the example considered are a fetch stage, in which the commands to be processed are fetched from the program memory, a decoder stage, in which the commands to be processed are decoded, an execute stage, in which the commands to be processed are executed, and a write-back stage, in which the results produced in the execute stage are written into a memory.

For completeness, it should be noted that the pipeline can also contain more, fewer or other pipeline stages.

The memories in which the data output in the write-back stage is stored are the storage devices S1 to S3. Also stored in the storage devices are the operands that are needed for command execution and which are read as required by the cores C1 and C2.

The storage devices S1 to S3 in the example considered are formed by register sets in each case containing a plurality of registers. The storage devices S1 to S3 can, however, also be implemented by any other desired memories.

The first storage device S1 is read by the first core C1 and is written by the first core C1.

The second storage device S2 is read by the second core C2 and written by the first core C1.

The third storage device S3 is read by the second core C2 and written by the second core C2.

During proper operation of the configuration:

a) the core C1 causes the commands to be executed to be output by the program memory, whereupon the commands are fed directly to the core C1 and to the core C2 via the delay apparatus already mentioned above but not shown in the FIGURE;

b) the core C1 reads the operands needed for command execution from the first storage device S1;

c) the core C1 writes the data produced during the command execution into the first storage device S1 and into the second storage device S2;

d) the core C2 reads the operands needed for command execution from the second storage device S2; and e) the core C2 writes the data produced during the command execution into the third storage device S3.

The data read from the first storage device S1 by the core C1 is fed to the core C1 via the first multiplexer MUX1. The multiplexer MUX1 is also fed with the data which is output from the second storage device S2 as requested by the core C2; however, during normal operation of the configuration, the multiplexer MUX1 is driven in such a way that it passes the data output by the first storage device S1 on to the core C1.

The data read from the second storage device S2 by the core C2 is fed to the core C2 via the second multiplexer MUX2. The multiplexer MUX2 is also fed with the data output by the first multiplexer MUX1; however, during normal operation of the configuration, the multiplexer MUX2 is driven in such a way that it passes the data output by the second memory device S2 on to the core C2.

The data output by the first multiplexer MUX1 is fed to the second multiplexer MUX2 via the delay apparatus D2, that is to say delayed by the delay time td.

The data written into the storage devices S1 and S2 by the core C1 is fed directly to the first storage device S1 and to the second storage device S2 via the first delay apparatus D1, that is to say is fed delayed by the delay time td.

The data produced by the core C2 during the execution of the commands is written into the third storage device S3 by the core C2 via the signature generator SG2.

The signature generator SG2 generates a signature from the data fed to it. In this case, the original data is used to form a code representing specific characteristics of this data. In the example considered, the code is a cyclic redundancy check (CRC) code or an error correction code (ECC).

However, other codes can also be formed. This also applies to the signature generators SG1 and SG3; the signature generators SG1 to SG3 are signature generators that are constructed and operate identically.

Storing a signature instead of the data output by the core C2 in the third storage device S3 is advantageous, since the signature data is less comprehensive than the data output by the core C2, and the third storage device S3 can therefore be constructed to be smaller than the storage devices S1 and S2. For completeness, it should be noted that it would also be possible to dispense with the signature generator SG2, that is to say the data output by the second core C2 can also be written into the third storage device S3. In this case, the other signature generators SG1 and SG3 could also be dispensed with.

The configuration shown in the FIGURE also contains monitoring devices that monitor whether the system operates properly. The monitoring devices are the read monitoring device RMU already mentioned above and the write monitoring device WMU likewise already mentioned above.

The read monitoring device RMU checks whether the data caused to be output from the storage device S2 by the core C2 and the data caused to be output from storage device S3 by the core C2 are identical or correspond to each other.

Figure 2:
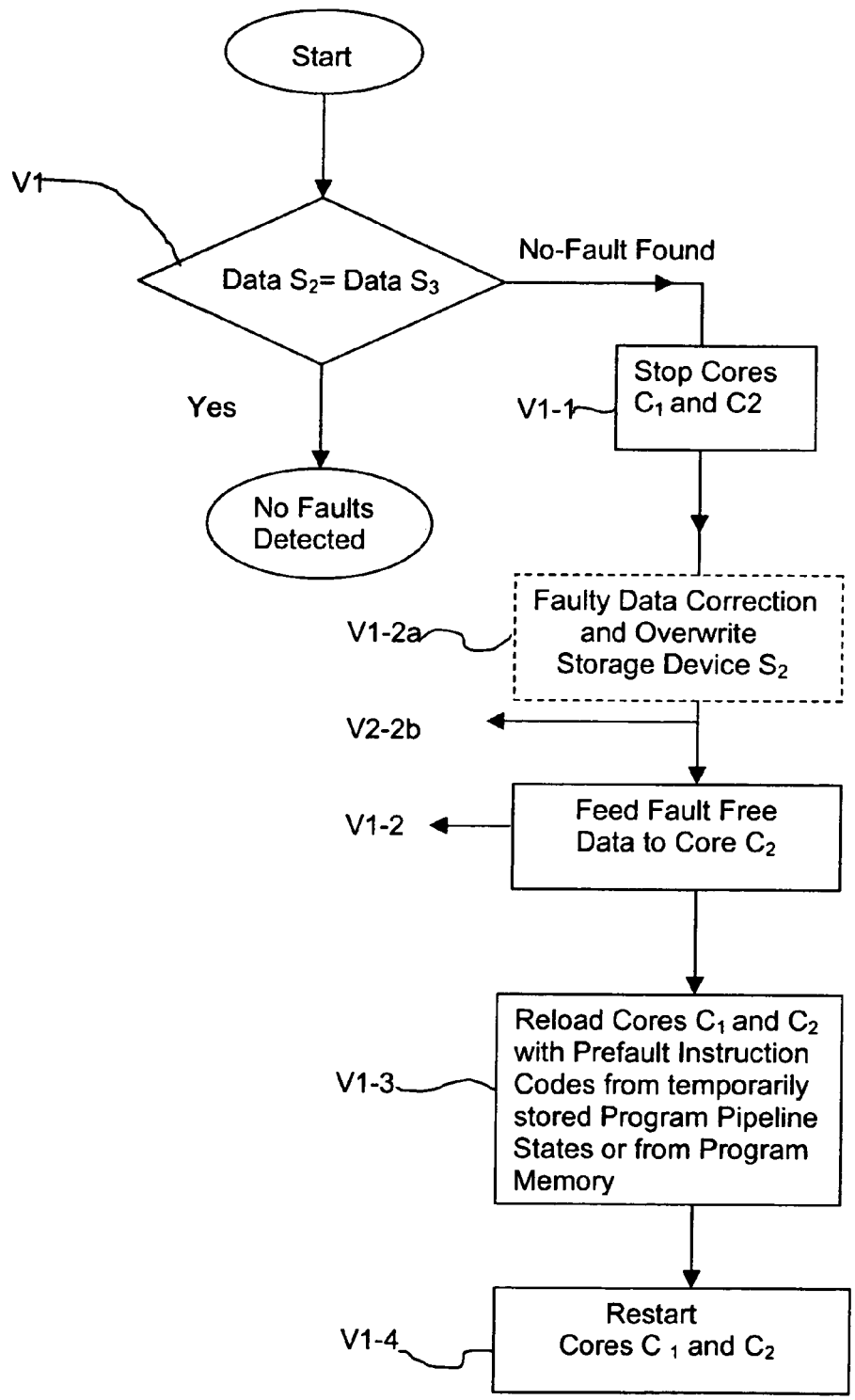
FIGS. 2–4 are flowcharts for explaining the invention.
Figure 3:
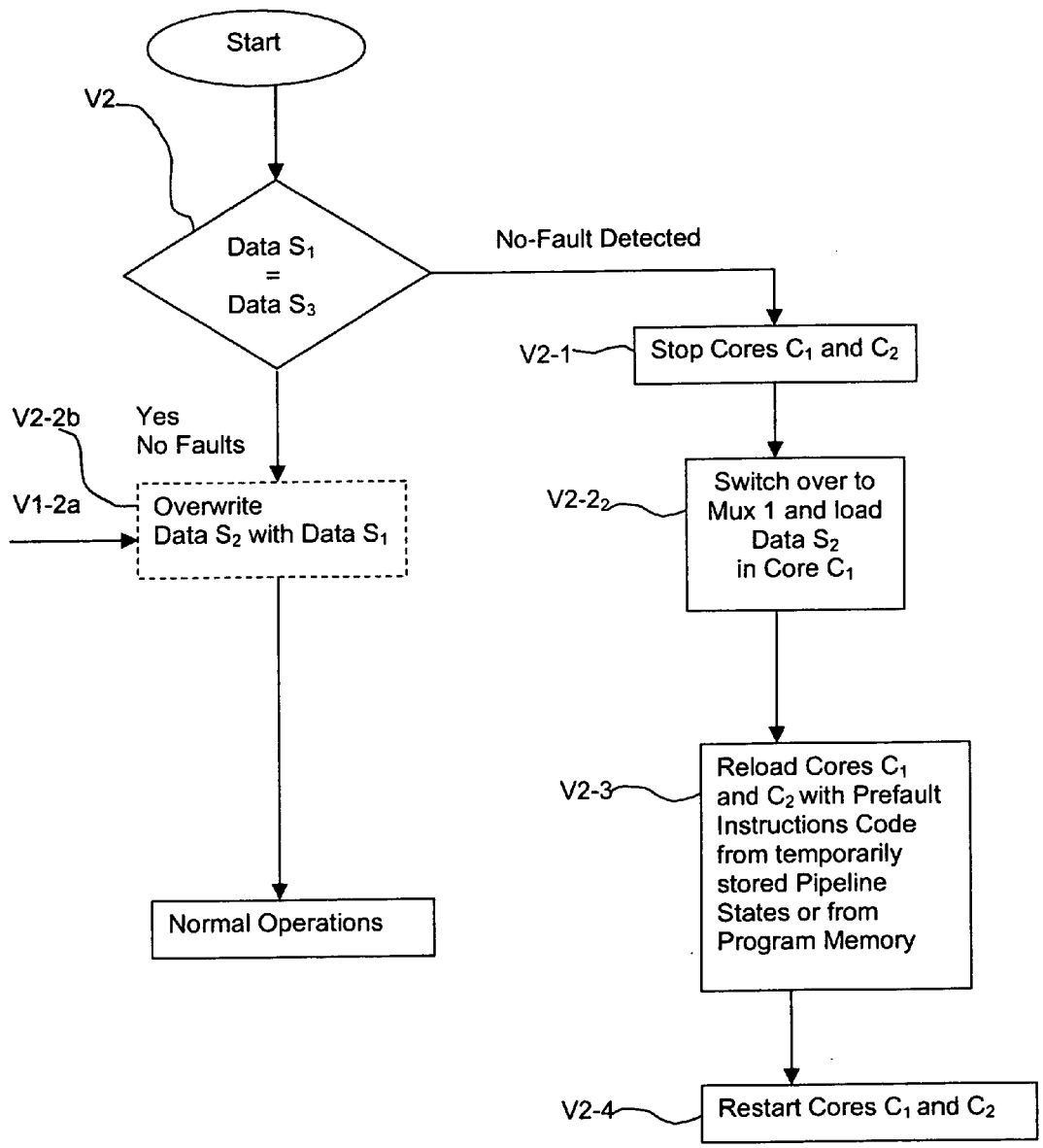
Figure 4:
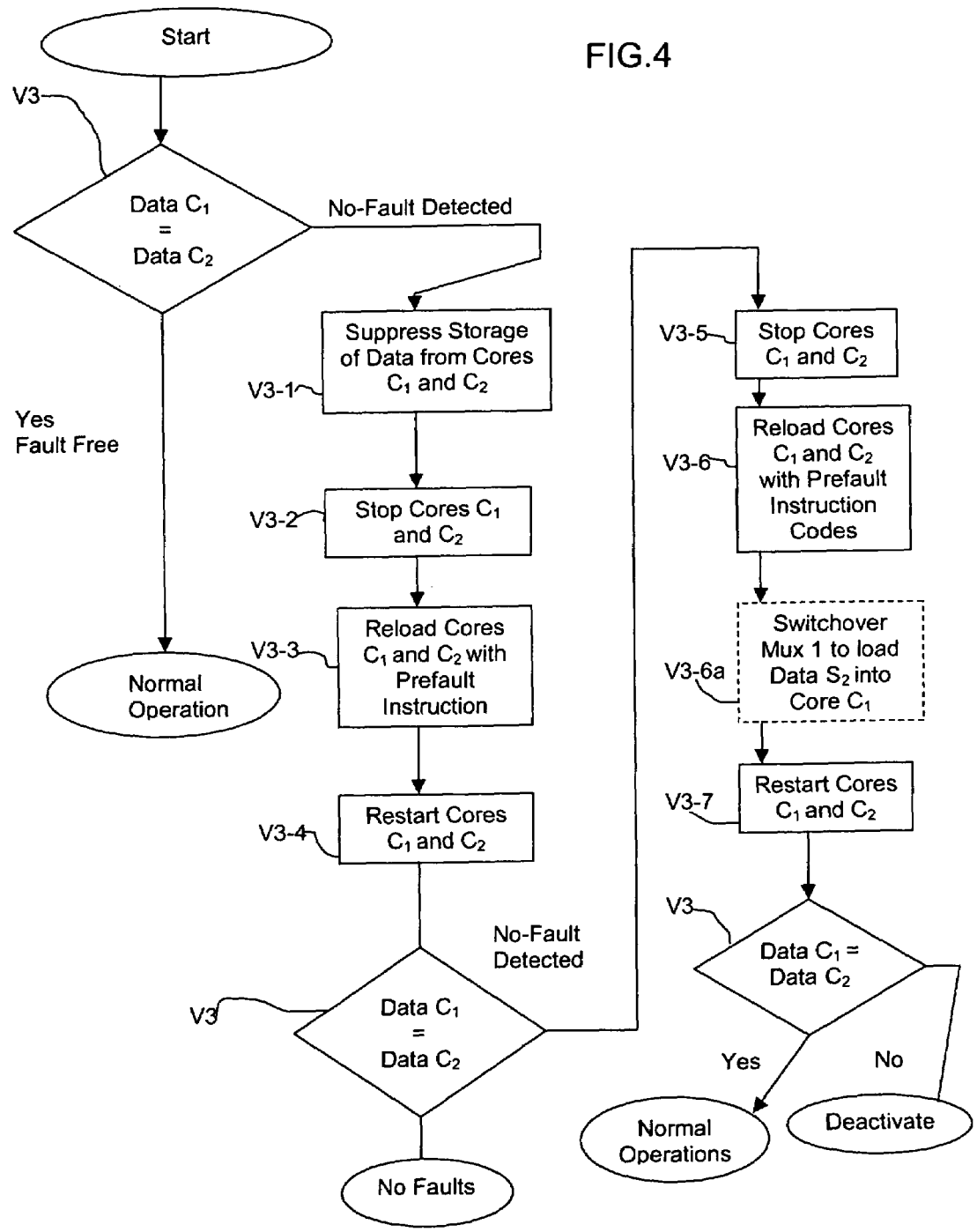
Figure 2:
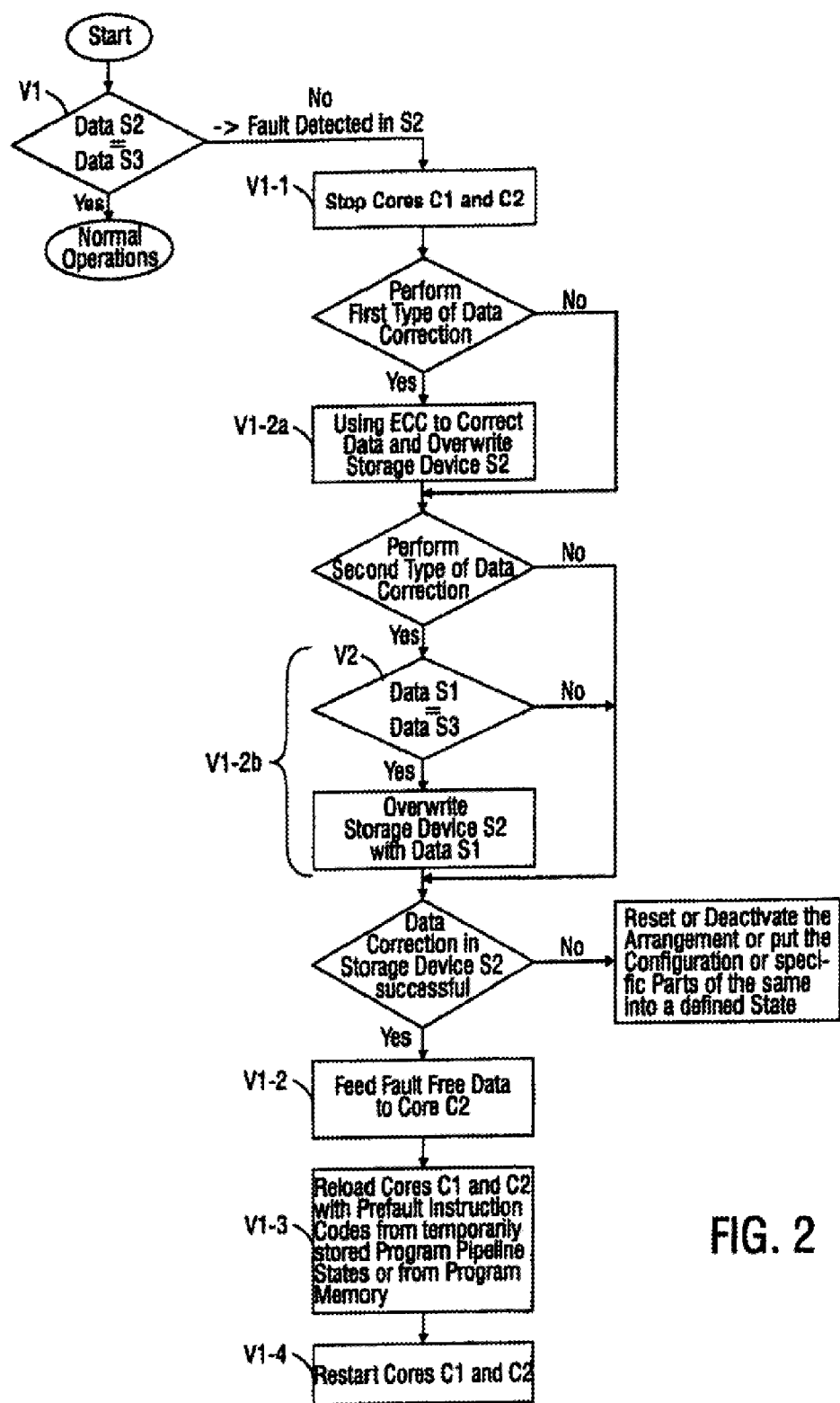
Figure 3:
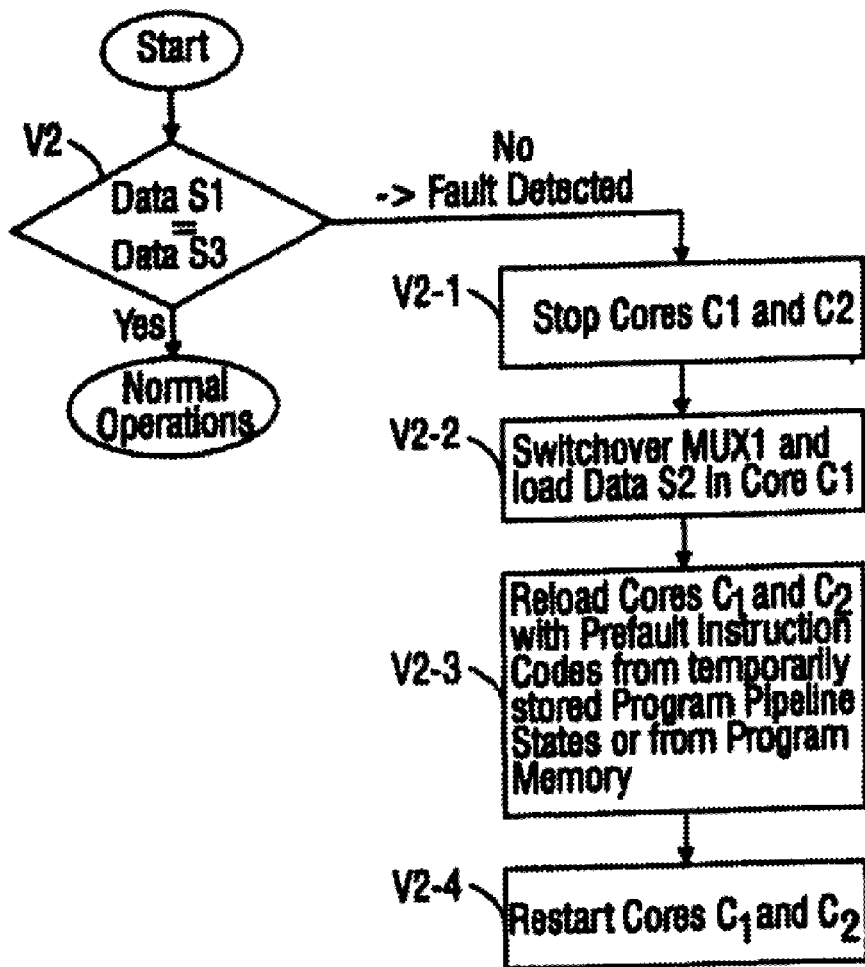
Figure 4:
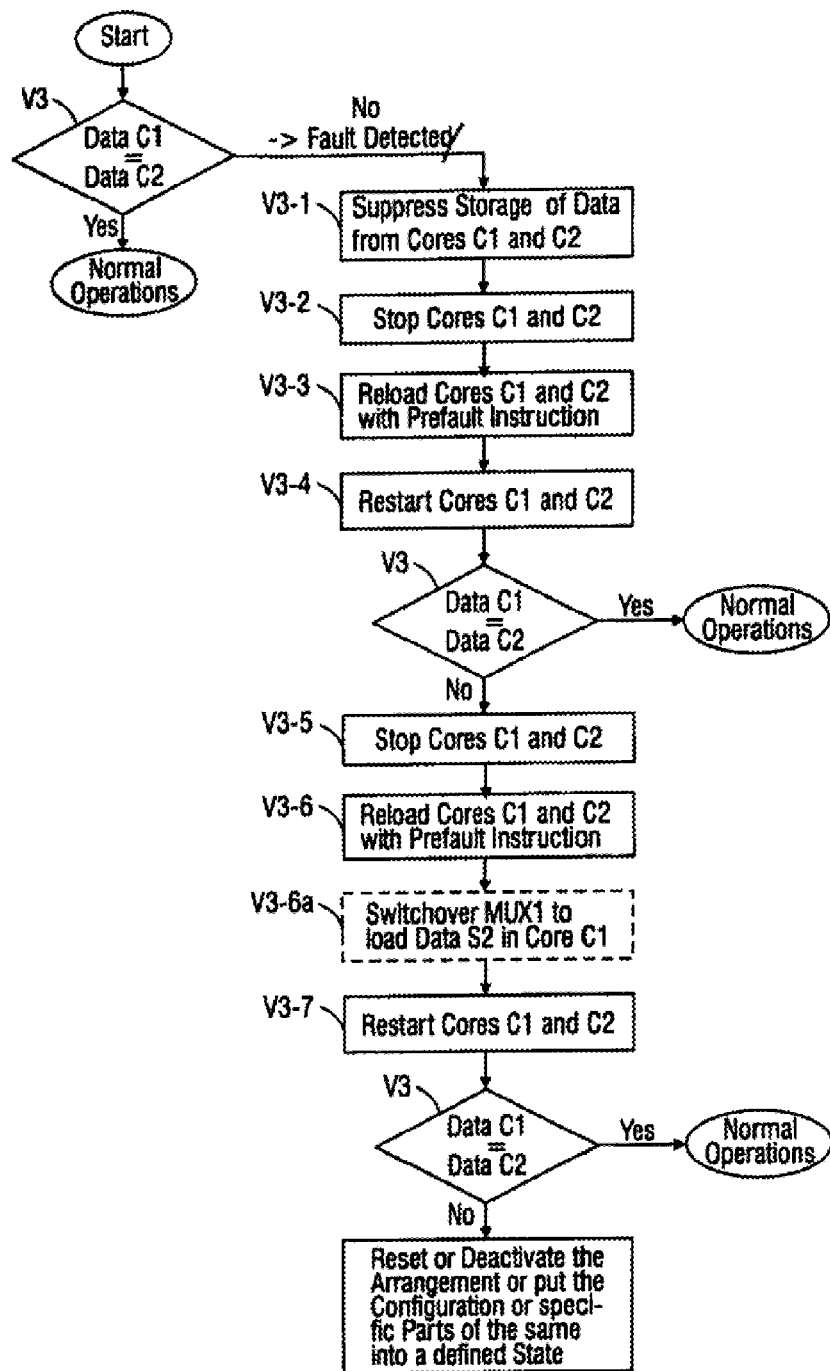
Figure 2:
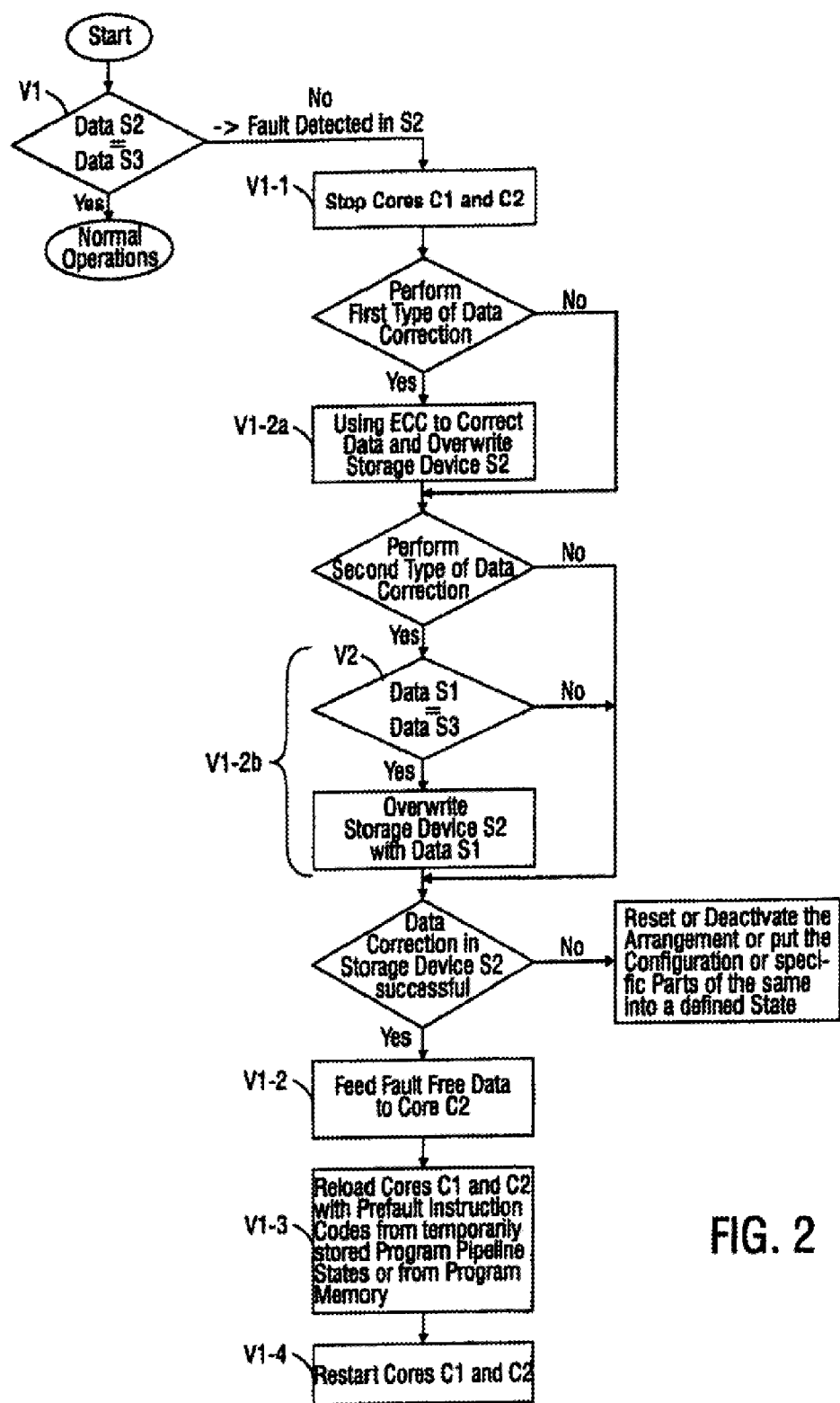
Figure 3:
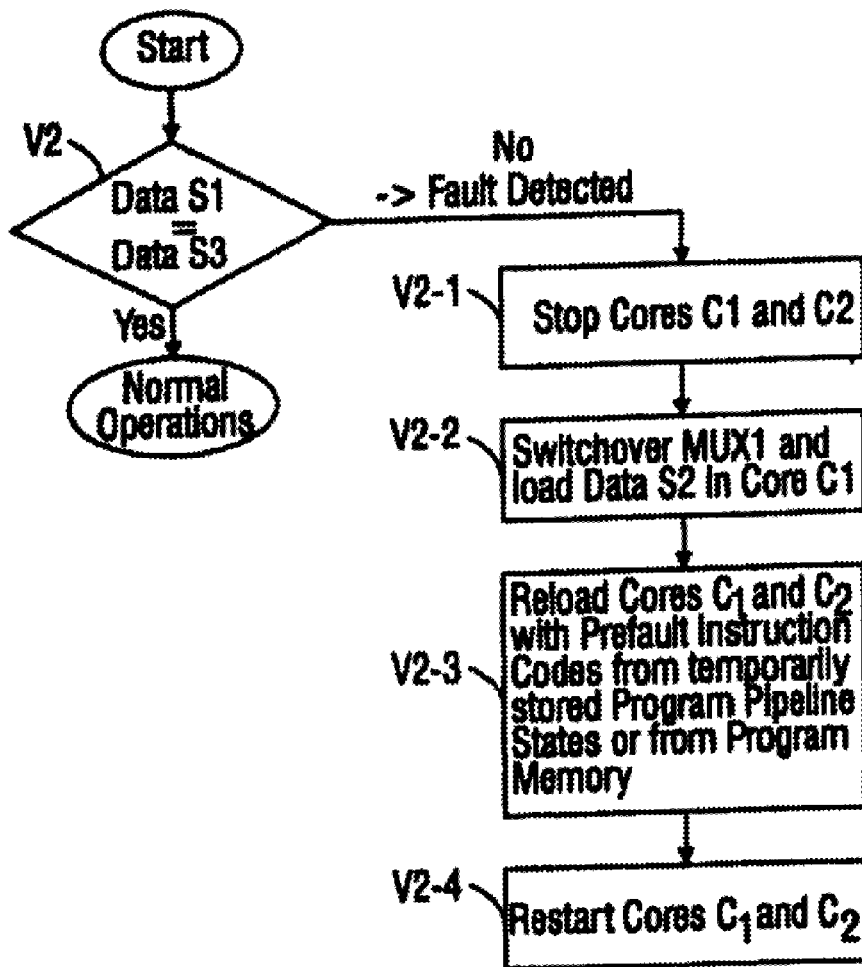
Figure 4:
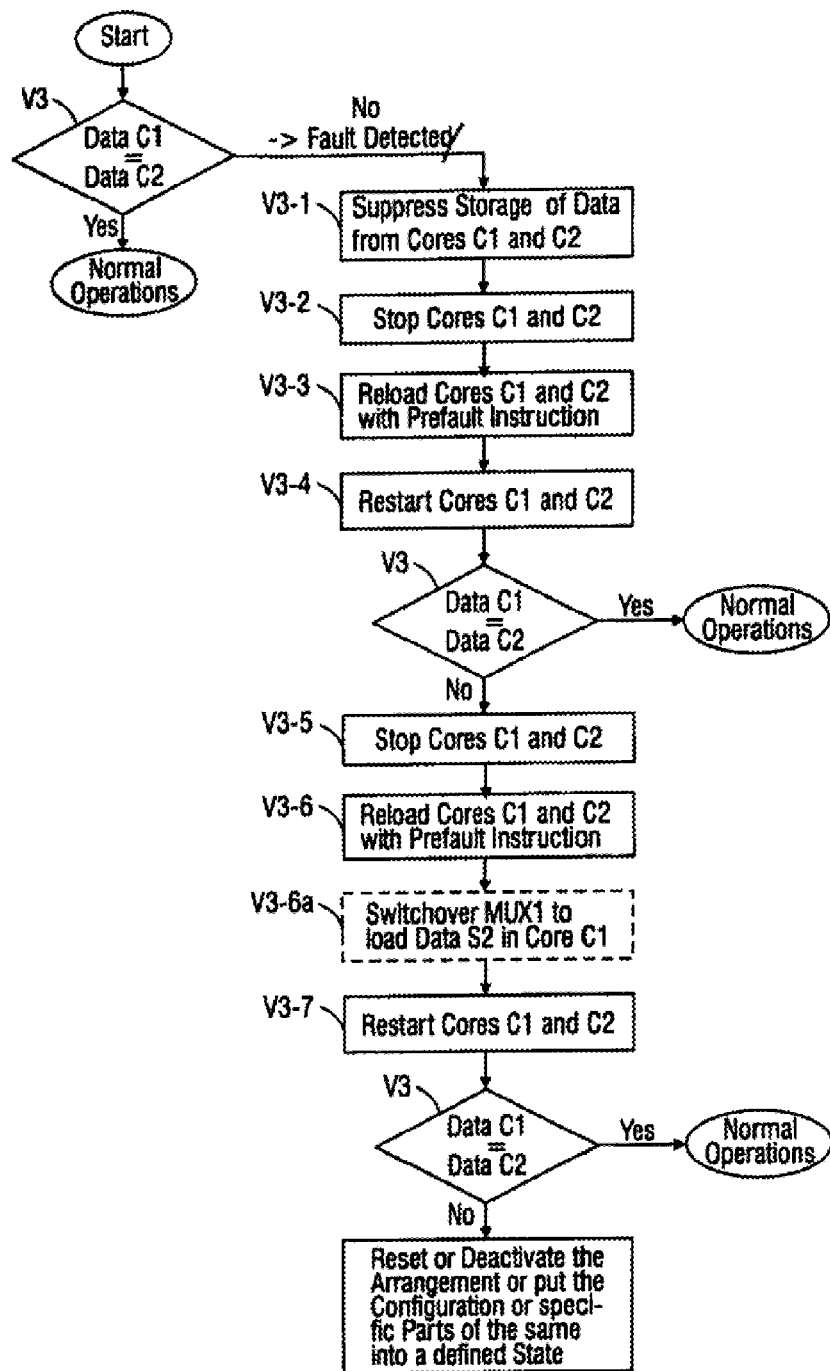

In more precise terms and as shown in FIGS. 2–4, it is the case that the read monitoring device RMU:

a) by use of a comparison designated comparison V1 below, determines whether the data formed by the signature generator SG3 from the data output by the storage device S2, and the data output by the storage device S3 are identical or mutually corresponding data; and/or b) by use of a comparison designated comparison V2 below, determines whether the data formed by the signature generator SG3 from the data output by the storage device S1, and the data output by the storage device S3 are identical or mutually corresponding data.

In the case of proper operation of the configuration, the data compared with one another would have to agree, since the storage devices S1 to S3 are written by the cores C1 and C2 with identical or mutually corresponding data, and since the data compared by the read monitoring device RMU has been read out from identical or mutually corresponding addresses in the storage devices S1 to S3.

If the result of the comparisons carried out by the read monitoring device RMU is that the data compared are identical or correspond to one another, there is no fault, so that the configuration can continue to operate normally. Otherwise, that is to say when the compared data are not identical or do not correspond to one another, there is a fault, to which the read monitoring device RMU reacts by the measures described in more detail later.

In order to ensure proper operation of the configuration, it may be sufficient for the read monitoring device RMU to carry out only the comparison V1 and to react to faults registered in the process.

If, during the comparison V1, the read monitoring device RMU determines that the data compared with one another are not identical or mutually corresponding data:

a) it stops the cores C1 and C2 (step V1-1), b) it ensures that fault-free data is fed to the core C2 (step V1-2), c) it ensures that the cores C1 and C2, when operation is continued, begin with the execution of the operation which was being executed when the fault was registered (step V1-3), and d) permits the cores C1 and C2 to continue to run (step V1-4).

The step V1-2 can consist in the read monitoring device RMU, by using the signatures fed to it, in more precise terms by using an error correction code (ECC) contained in it, carries out a fault correction on the data output by the storage device S2, and overwrites the faulty data with the corrected data in the storage device S2. This is designated step V1-2a below.

In order to execute the step V1-3, provision can be made:

a) that, at regular intervals or else at least every time when one of the cores C1 and C2 fetches data from the storage devices S1 to S3, the current states of the pipelines of the cores C1 and C2 are stored temporarily in the cores, and b) that, in step V1-3, the temporarily stored pipeline state or one of the temporarily stored pipeline states is loaded into the pipeline.

Alternatively, provision can be made that the command for whose execution the data has to be fetched from one of the existing storage devices is loaded from the program memory again and executed.

The fact that the read monitoring device ensures that the cores C1 and C2, when operation is continued, begin with the execution of the operation which was being executed when the fault was registered, can also be brought about by the cores C1 and C2 being stopped so early that, when they are stopped, they are still in the state in which they were before the registered fault occurred. In this case, the step V1-3 can be dispensed with.

The read monitoring device RMU can also ensure in another way that fault-free data is fed to the core C2. This proves to be advantageous in particular when no error correction code is contained in the signature, or when correction of the faulty data by using the error correction code is not possible. The aforethe other fault correction is carried out in a step V2-2b, which is executed instead of the step V1-2a mentioned above or after the step V1-2a.

In step V2-2b, the read monitoring device RMU carries out the comparison V2 first.

The comparison is carried out when the second multiplexer MUX2 switches over, that is to say is driven in such a way that it passes on the data output by the first multiplexer MUX1 and delayed by the delay apparatus V2.

If the result of the comparison V2 carried out by the read monitoring device RMU is that the compared data are identical or correspond to one another, the part of the second storage device S2 containing the faulty data is overwritten with the content of the first storage device S1. However, this must not be carried out if the data in the first storage device S1 on which the comparison is based has been overwritten in the meantime. In this case, the configuration or specific parts of the same must be put into a defined state or reset or deactivated. The configuration or specific parts of the same must also be put into a defined state or reset or deactivated when the comparison V2 results in the compared data not being identical or not corresponding to one other.

Furthermore, the configuration or specific parts of the same must be put into a defined state or reset or deactivated if the step V1-2b is not carried out and no fault correction is possible by the step V1-2a.

Instead of overwriting the second storage device S2 with the content of the first storage device S1, provision could be made to switch over the second multiplexer MUX2, that is to say to drive it in such a way that it passes on the data output by the first multiplexer MUX1 and delayed by the delay apparatus D2. However, this may not be carried out either when the data from the first storage device Si on which the comparison is based has been overwritten in the meantime. In this case, the configuration or specific parts of the same must likewise be put into a defined state or reset or deactivated.

Carrying out the comparison V2 also proves to be advantageous if the read monitoring device RMU has determined, during the comparison V1, that the data compared with one another agree or if a determined fault could be corrected by the step V1-2a mentioned above. If, in this case, it is determined by the comparison V2 that the data output from the first storage device S1 is faulty or could be faulty, provision can be made for the read monitoring device RMU:

a) to stop the cores C1 and C2 (step V2-1), b) to switch over the first multiplexer MUX1 so that the data originating from the second storage device S2 is passed on to the core C1 (step V2-2), c) to ensure that the cores C1 and C2, when operation is continued, begin with the execution of the operation which was being executed when the registered fault occurred (step V2-3), and d) to permit the cores C1 and C2 to continue to run (step V2-4).

The execution of step V2-3 can be carried out in the same way as the execution of step V1-3.

Provision could also be made for the read monitoring device RMU to carry out the comparison V2 and the corrective measures which may be required first, and only then to carry out the comparison V1 and the corrective measures which may be required.

The write monitoring device WMU checks whether the data output by the core C1 and the data output by the core C2 agree or correspond to one another.

In more precise terms, it is the case that the write monitoring device WMU determines, by a comparison designated comparison V3 below, whether the data formed by the signature generator SG1 from the data output by the core C1 and delayed by the delay apparatus D1, and the data formed by the signature generator SG2 from the data output by the core C2 are identical or mutually corresponding data. In the case of proper operation of the configuration, the data would have to agree, since the cores C1 and C2 run the same program and use the same operands. If the result of the comparison V3 carried out by the write monitoring device WMU is that the data compared are identical or correspond to one another, there is no fault, so that the configuration can continue to operate normally. Otherwise, that is to say if the compared data are not identical or do not correspond to one another, there is a fault, to which the write monitoring device WMU reacts.

The reaction of the write monitoring device WMU consists in:

a) suppressing the storage of the data output by the core C1 in the storage device S2 and the storage of the data output by the core C2 in the storage device S3 (step V3-1), b) stopping the cores C1 and C2 (step V3-2), c) ensuring that the cores C1 and C2, when operation is continued, begin with the execution of the operation which was being executed when the core C1 output the data on which the comparison V3 was based (step V3-3), and d) causing the cores C1 and C2 to continue to operate (step V3-4).

After the cores C1 and C2 have been started again, in more precise terms td later, the write monitoring device WMU carries out the comparison V3 again and checks whether the data output by the cores C1 and C2 are data that agree with one another or correspond to one another. The fact that it was determined during the first comparison V3 that this is not the case does not automatically result in this also being the case during the repetition; the cause of the fault determined during the first comparison V3 can be a temporary fault in the write-back stage in the core C1 and/or in the core C2, and/or a temporary fault on the lines via which the data is transmitted after being output by the cores C1 and C2.

If, during the renewed comparison V3, the write monitoring device WMU determines that the compared data agree or correspond to one another, the configuration can continue to operate normally.

Otherwise, the write monitoring device WMU ensures:

a) that the cores C1 and C2 are stopped (step V3-5), b) that the cores C1 and C2, when operation is continued, begin with the execution of the instructions which were in the write-back stage of the pipeline at the time at which the core C1 output the data on which the comparison V3 was based (step V3-6), and c) that the cores C1 and C2 are caused to continue to operate (step V3-7).

In particular if no comparison V2 is carried out by the read monitoring device RMU, it may prove to be advantageous if an additional step V3-6a is inserted after the step V3-6, in which additional step the first multiplexer MUX1 is switched over, that is to say is driven in such a way that the first multiplexer MUX1 passes on the data output by the second storage device S2 to the core C1.

After the cores C1 and C2 have been restarted, in more precise terms td later, the write monitoring device WMU carries out a comparison V3 again and checks whether the data output by the cores C1 and C2 are data that agree or correspond to one another.

If, during the renewed comparison V3, the write monitoring device WMU determines that the compared data agree or correspond to one another, the configuration can continue to operate normally. If step V3-6a was carried out previously, the multiplexer MUX1 is switched back into the original state. Otherwise, the write monitoring device WMU ensures that the configuration is put into a defined state or reset or deactivated.

The fact that, both by the read monitoring device RMU and by the write monitoring device WMU, it is ensured that the cores C1 and C2 repeat the operations whose faulty execution may be the cause of the registered fault, makes it possible to determine whether the registered fault is a permanent fault or only a single or temporary fault.

This in turn makes it possible, with little effort and without noticeable disruption for the operation of the configuration, for the configuration or parts of the same to be deactivated or reset only when the fault that has occurred is not a temporary fault.

I claim:

1. A system, comprising:

an electric control device for outputting data; and a monitoring device coupled to said electrical control device and monitoring whether the system is operating properly;

if said monitoring device determines that the system is not operating properly, said monitoring device stops said electrical control device and ensures that said electrical control device, when operation continues, begins with execution of an operation whose faulty execution may be a cause of a fault registered or which was being executed when the fault was registered;

said monitoring device determining whether the fault registered during the monitoring is a temporary or a permanent fault without resetting said control device or the system, the system or specific parts of the system being reset or deactivated if the fault registered occurs again after the operation of said control device has been continued, and the system continuing to operate normally if the fault does not reoccur.

2. The system according to claim 1, wherein if said monitoring device determines that the system is not operating properly, said monitoring device resets said electrical control device into a state which the system had at a time at which the system was still operating properly.

3. The system according to claim 1, further comprising a further control device for outputting further data, said further control device being coupled to said monitoring device, said monitoring device assumes that the system is not operating properly if said monitoring device determines, during monitoring, that the data output by said electric control device does not agree with the further data or does not correspond to the further data output by said further control device.

4. The system according to claim 3, wherein said electrical control device and said further control device are devices that execute or bring about the same or mutually corresponding actions.

5. The system according to claim 3, wherein if said monitoring device determines that the system is not operating properly, said monitoring device causes said electrical control device to repeat an output of the data.

6. The system according to claim 5, wherein said monitoring device causes said electrical control device to repeat the data output by resetting said electrical control device into a state which said electrical control device had immediately before outputting the data.

7. The system according to claim 6, wherein said electrical control device is a core of a program-controlled unit, commands to be executed by said core pass through a pipeline, and said monitoring device causes said electrical control device to repeat the data output by resetting said pipeline into a state which said pipeline had when it carried out the outputting of the data for a first time.

8. The system according to claim 5, wherein said monitoring device causes said electrical control device to repeat the data output by resetting said electrical control device into a state which said electrical control device had at a start of executing an operation causing the data output.

9. The system according to claim 8, wherein said electrical control device is a core of a program-controlled unit, and said monitoring device causes said electrical control device to repeat the data output by ensuring that a command causing the data output is loaded again and executed again.

10. The system according to claim 9, further comprising a storage device coupled to said core, said monitoring device ensures that, during a renewed execution of the command, said core is fed with operands needed to execute the command from said storage device being a different storage device than was used during a preceding execution of a relevant command.

11. The system according to claim 1, further comprising:
a storage device coupled to said electrical control device; and
a further control device for outputting further data, said further control device being coupled to said monitoring device, said monitoring device assumes that the system is not operating properly if said monitoring device determines, during monitoring, that data fed to said electrical control device from said storage device does not agree with data which one of said electrical control device and said further control device has previously written into said storage device.

12. The system according to claim 11, wherein said electrical control device and said further control device are devices that one of execute and bring about the same or mutually corresponding actions.

13. The system according to claim 11, wherein if said monitoring device determines that the system is not operating properly, said monitoring device ensures that faulty data is corrected.

14. The system according to claim 13, wherein a correction is made by using a code permitting an error correction.

15. The system according to claim 13, further comprising a further storage device, and a correction is made by overwriting a part of said storage device storing the faulty data with data stored in said further storage device.

16. The system according to claim 11, wherein if said monitoring device assumes that the system is not operating properly, said monitoring device influences said electrical control device to read corrected data in after correcting faulty data.

17. The system according to claim 16, wherein influencing said electrical control device consists in ensuring that said electrical control device is in a state which said electrical control device had when the faulty data was fed to it.

18. The system according to claim 17, wherein influencing said electrical control device includes stopping said electrical control device at least until a time at which the faulty data is corrected.

19. The system according to claim 17, wherein said electrical control device is a core of a program-controlled unit, commands to be executed by said core pass through a pipeline, and in that influencing said electrical control device includes resetting said pipeline into a state which said pipeline had when the faulty data was fed to said pipeline.

20. A method of operating a system having an electric control device and a monitoring device for monitoring whether the system is operating properly, which comprises the steps of:
determining if the system is operating properly;
stopping the electrical control device if the system is not operating properly, and ensuring that the electrical control device, when operation is continued, begins with an execution of an operation whose faulty execution may be a cause of a fault registered or which was being executed when the fault was registered; and
determining by the monitoring device whether the fault registered during the monitoring is a temporary or a permanent fault without resetting the control device or the system, resetting or deactivating the system or specific parts of the system if the fault registered occurs again after the operation of the control device has been continued, and continuing to operate the system normally if the fault does not reoccur.

21. The method according to claim 20, which further comprises:
resetting the electrical control device into a state which the electrical control device had at a time at which the system was still operating properly if it is determined that the system is not operating properly.

22. The method according to claim 20, which further comprises:
assuming the system is not operating properly if, during monitoring, it is determined that data output by the electrical control device does not agree with or correspond to further data output by a further control device.

23. The method according to claim 22, which further comprises using the electrical control device and the further control device as devices that execute or bring about the same or mutually corresponding actions.

24. The method according to claim 22, which further comprises causing the electrical control device to repeat an outputting of the data if it is determined that the system is not operating properly.

25. The method according to claim 24, which further comprises causing the electrical control device to repeat the data output by resetting the electrical control device into a state which the electrical control device had immediately before the outputting of the data.

26. The method according to claim 25, which further comprises:
using the electrical control device as a core of a program-controlled unit;
passing commands to be executed by the core through a pipeline; and
causing the electrical control device to repeat the data output by resetting the pipeline into a state which the pipeline had when the electrical control device carried out the data output for the first time.

27. The method according to claim 24, which further comprises causing the electrical control device to repeat the data output by resetting the electrical control device into a state which the electrical control device had at a start of an execution of an operation that caused the data output.

28. The method according to claim 27, which further comprises:
using the electrical control device as a core of a program-controlled unit; and
causing the electrical control device to repeat the data output by ensured that a command that causes the data output is loaded again and executed again.

29. The method according to claim 28, which further comprises during a renewed execution of the command, feeding the core with operands needed to execute the command from a different storage device than was used during a preceding execution of the command.

30. The method according to claim 20, which further comprises:
assuming the system is not operating properly if, during monitoring, it is determined that data fed to the electrical control device by a storage device does not agree with or correspond to data which one of the electrical control device and a further control device has previously written into the storage device.

31. The method according to claim 30, which further comprises using the electrical control device and the further control device as devices that execute or bring about the same or mutually corresponding actions.

32. The method according to claim 30, which further comprises:
correcting faulty data if it is determined that the system is not operating properly.

33. The method according to claim 32, which further comprises making a correction by using a code permitting an error correction.

34. The system according to claim 32, which further comprises making a correction by overwriting a part of the storage device storing the faulty data with data stored in another storage device.

35. The method according to claim 34, which further comprises influencing the electrical control device to read in corrected data after the correction of the faulty data if the system is not operating properly.

36. The method according to claim 35, which further comprises influencing the electrical control device by ensuring that the electrical control device is in a state the electrical control device had when the faulty data was fed to it.

37. The method according to claim 36, which further comprises influencing the electrical control device to stop, at least until a time at which the faulty data is corrected.

38. The method according to claim 36, which further comprises:
using the electrical control device as a core of a program-controlled unit;
passing commands to be executed by the core through a pipeline; and
influencing the electrical control device by resetting the pipeline into a state which the pipeline had when the faulty data was fed.

* * * * *

UNITED STATES PATENT AND TRADEMARK OFFICE
CERTIFICATE OF CORRECTION

PATENT NO. : 7,159,152 B2  Page 1 of 4
APPLICATION NO. : 10/429576
DATED : January 2, 2007
INVENTOR(S) : Von Wendorff It is certified that error appears in the above-identified patent and that said Letters Patent is hereby corrected as shown below:

Delete drawing sheets 1-3, and substitute therefor the drawing sheets, consisting of Figs 2-4 as shown on the attached pages.

Signed and Sealed this

Fifth Day of August, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,159,152 B2 |
| APPLICATION NO. | : 10/429576 |
| DATED | : January 2, 2007 |
| INVENTOR(S) | : Von Wendorff |

It is certified that error appears in the above-identified patent and that said Letters Patent is hereby corrected as shown below:

Delete drawing sheets 2-4, and substitute therefor the drawing sheets, consisting of Figs 2-4 as shown on the attached pages.

This certificate supersedes the Certificate of Correction issued August 5, 2008.

Signed and Sealed this

Twenty-sixth Day of August, 2008

JON W. DUDAS
*Director of the United States Patent and Trademark Office*